J. PRENTICE.
Cigar-Molds.
No. 6,210. Reissued Jan. 5, 1875.
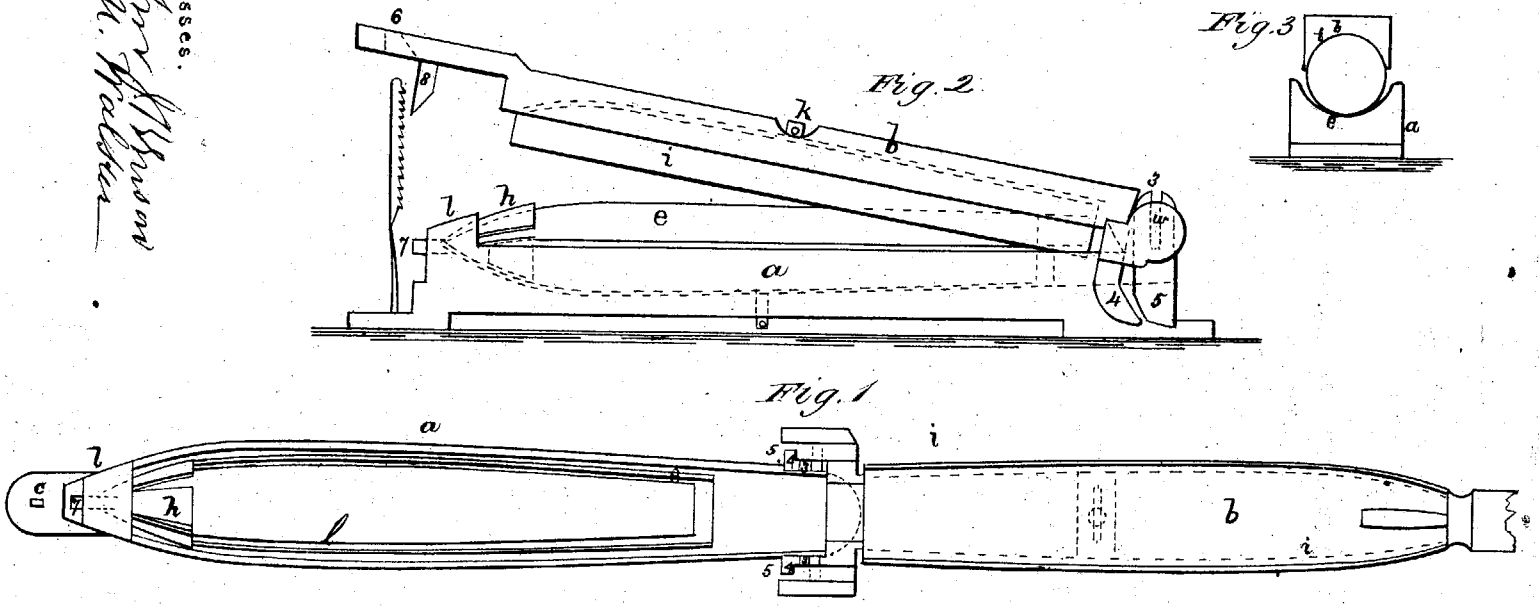
Witnesses.
John J. Brown
A. M. Walker
Inventor
John Prentice
per his atty
Chas Rogers
THE GRAPHIC CO. PHOTO-LITH. 38 & 41 PARK PLACE, N.Y.

UNITED STATES PATENT OFFICE.

JOHN PRENTICE, OF NEW YORK, N. Y., ASSIGNOR, BY MESNE ASSIGNMENTS, TO WILLIAM H. TERWILLIGER AND JOHN S. LOCKWOOD.

IMPROVEMENT IN CIGAR-MOLDS.

Specification forming part of Letters Patent No. 85,764, dated January 12, 1869; reissue No. 6,210, dated January 5, 1875; application filed April 15, 1874.

*To all whom it may concern:*

Be it known that I, JOHN PRENTICE, of the city, county, and State of New York, have invented new and useful Improvements in Cigar-Makers' Molds; and I do hereby declare that the following is a full, clear, and exact description thereof, reference being had to the accompanying drawings, and to the letters of reference marked thereon, making a part of this specification.

It is well known among manufacturers of cigars that after they are made they present a rough and uneven surface, which is in consequence of the wrapper being pressed into or upon the uneven surface or inequalities of the filling. This is especially the case when the cigar is made with a machine which is provided with elastic rollers.

The object of my invention is to avoid and overcome this difficulty by providing an apparatus or device which gives to the cigar a smooth, regular, and uniform appearance, by removing all the irregularities of the surface of the cigar previous to the cigar becoming dry or set in form.

I make use of a mold, into which the cigar is placed, after it has been made up, and subjected to a slight, but uniform, pressure, sufficient to lessen or remove any projecting inequalities, and, by retaining the cigar in the mold for a short time, the shape given becomes permanent. The mold may also be employed to shape the bunches before applying the wrappers. If the molds were of rigid character, the slight inequalities in the size and shape would not be allowed for, and the cigars, after pressing, would be irregular in form and still rough and uneven in surface. I therefore make my mold of thin sheet-steel or other suitable elastic material, in two sections longitudinally, the edges of the one section being a little larger than the edges of the other section, so that as the two sections are brought together in operative position the edges of one section pass between the edges of the other with an elastic contact and pressure. The elasticity of the mold will cause the cigar to be closely enveloped and pressed upon all sides and upon all portions of its surface with a uniform force, or nearly so, irrespective of those slight irregulaties of size and surface above mentioned, and as one section passes within the other, and in elastic contact therewith, there will be no seam-mark along the side of the cigar, as would be the case if the mold were rigid in character. Because the sections of this mold are made of thin and elastic material, it is necessary to support and back them up with a rigid structure to protect them from injury, and to facilitate the handling and use of them.

To enable others skilled in the art to make and use my invention, I will proceed to describe its construction and operation.

Figure 1 is a plan view of a single mold open, the same being hinged at one end. Fig. 2 is a side elevation of the mold, partially closed. Fig. 3 is a transverse sectional elevation of Figs. 1 and 2.

Letters of like name and kind indicate like parts in each of the figures.

In the drawings, *i* and *e* represent, respectively, the larger and smaller sections of the mold, made of thin elastic material, as above set forth, said section being formed to represent interiorly, when properly together, the shape of a cigar. *a* and *b* are rigid backings, to support and protect the mold. These backing-pieces may be jointed at one end with a hinge, 2, so that the mold may be readily opened and closed with accuracy. The sections *i e* may be retained in their respective backings by means of small lugs *k* and pins. A conical tip-former, *h*, may be employed. It has a stem, 7, which projects forward through the end *l* of the backing *a*, and is forced inward by an inclined pin, 8, attached to the backing *b*, when the same is brought down to close the mold. The backings may be held together and the mold kept closed as long as may be desired by a ratchet-bar, secured to one part and engaging with the other; but it is evident that the essential feature of this improvement consists of the mold made of elastic sections, and that the precise method of mounting and operating said sections is not material to the result of the operation of said sections themselves.

Having thus described my invention, what I claim as new, and desire to secure by Letters Patent, is—

1. A cigar-mold constructed of elastic metal or other suitable material, so that one part of the mold will close or shut into the other with a springing or yielding action, the part that matches in being provided with comparatively sharp edges, substantially as herein shown and described.

2. A yielding cigar-mold, composed of sheet metal, capable of contracting when one part is pressed into the other, and again resuming its form when released, substantially as described.

3. In combination with the molds *e i*, the backings *a b*, provided with hinge 2, projections 4, shoulder 5, and catches *c*, substantially as for the purpose set forth.

JOHN PRENTICE.

Witnesses:

J. HARRINGTON,

CHARLES ROGERS.